United States Patent
Mallia

(10) Patent No.: US 9,237,159 B2
(45) Date of Patent: Jan. 12, 2016

(54) INTEROPERABILITY BETWEEN AUTHORIZATION PROTOCOL AND ENFORCEMENT PROTOCOL

(71) Applicant: Edmond Scientific Company, Chantilly, VA (US)

(72) Inventor: Anthony J. Mallia, Boxford, MA (US)

(73) Assignee: EDMOND SCIENTIFIC COMPANY, Chantilly, VA (US)

( * ) Notice: Subject to any disclaimer, the term of this patent is extended or adjusted under 35 U.S.C. 154(b) by 0 days.

(21) Appl. No.: 14/292,049

(22) Filed: May 30, 2014

(65) Prior Publication Data

US 2014/0359696 A1 Dec. 4, 2014

Related U.S. Application Data

(60) Provisional application No. 61/831,056, filed on Jun. 4, 2013.

(51) Int. Cl.
*H04L 29/06* (2006.01)

(52) U.S. Cl.
CPC ................................. *H04L 63/102* (2013.01)

(58) Field of Classification Search
CPC ............................. H04L 63/10; H04L 63/102
See application file for complete search history.

(56) References Cited

U.S. PATENT DOCUMENTS

| | | | |
|---|---|---|---|
| 8,745,718 B1* | 6/2014 | Dufel et al. | 726/9 |
| 2010/0306818 A1* | 12/2010 | Li | G06F 17/3092 726/1 |
| 2014/0075518 A1* | 3/2014 | D'Souza et al. | 726/4 |

* cited by examiner

*Primary Examiner* — Matthew Henning
(74) *Attorney, Agent, or Firm* — Staas & Halsey LLP

(57) ABSTRACT

The disclosure comprises methods, devices and computer programs to provide interoperability between incompatible security architectures, protocols, or domains. Policy rules of an authorization protocol are applied to an access request made in an enforcement protocol, and a result of the application are produced. A decision may be made as to whether to issue/reissue an authorization of the access request based on the result of applying the policy rules to the access request. Other embodiments are also provided.

17 Claims, 4 Drawing Sheets

INTEROPERABILITY BETWEEN AUTHORIZATION PROTOCOL AND ENFORCEMENT PROTOCOL

CROSS-REFERENCE TO RELATED APPLICATIONS

This application is related to and claims the benefit of priority to Provisional Application U.S. Ser. No. 61/831,056, entitled HYBRID XACML-OAUTH AUTHORIZATION CONTROL SYSTEM (ACS) FOR AUTOMATIC ACCESS CONTROL DECISIONS IN BOTH RESTFUL AND SAML ENVIRONMENTS, by Anthony J. Mallia of the Edmond Scientific Company (Chantilly, Va.), filed Jun. 4, 2013 in the U.S. Patent and Trademark Office, the contents of which are incorporated herein by reference.

BACKGROUND

1. Field

One or more embodiments relate to methods, devices and computer programs to provide interoperability between traditionally incompatible security domains, architectures or access control protocols.

2. Description of the Related Art

When security architectures or access control protocols are incompatible, the authentication of users and authorization to access information between them presents a challenge. For example, one system may be utilizing a different security standard or protocol from that of another system and may not be readily interoperable or able to enforce access control policies. This creates systematic challenges when an access request to data needs to be authorized and enforced by different security architectures, or across different security systems using different access control protocols.

Further, organizations largely rely on the thoroughness of security administrators to give users access to information. More recent technology allows these decisions to be made with electronic policy rules but the enforcement of this methodology requires significant change to existing products. It is not currently possible to make automated or semi-automated (mechanized) authorization decisions that are enforced through the existing product Mechanisms—either Access Control Lists or Access Tokens. When two separate security domains exist, the problem of implementing access control policies over HTTP/REST/OAuth communication requires the ability to consume requests to access resources and enforce policies compliant with the trust framework.

These and other problems lead to a need for a solution which automates access control decisions to provide interoperability between incompatible security architectures or access control protocols, and integrates the enforcement of access control policies across incompatible security architectures or protocols. A solution is also needed to support cross-domain security interoperability, for example one that is used by both SAML/XACML and REST/OAuth protocols, among others.

SUMMARY

The disclosure comprises methods, devices and computer programs to provide security access control interoperability and integrate the enforcement of access control policies. Policy rules used in an authorization request are applied to an access request made in an enforcement protocol. A decision is made whether to issue/reissue an authorization of the access request based on the result of applying the policy rules to the access request. Other embodiments are also provided.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which.

DETAILED DESCRIPTION

The foregoing and/or other aspects are achieved by providing a Hybrid Access Control System (HACS) which includes the ability to enforce access control decisions and integrate access control policies between different architectures or protocols, and to support cross-domain security continuity. The present application may be applicable to any HACS integration of security architectures or protocols utilizing different standards which require security continuity for common access control policy enforcement.

An example of incompatible systems may be between XACML/SAML and RESTful/OAuth. Some commercial products use XACML, while others use RESTful/OAuth for their security protocols, and thus integration or interoperation between systems has not been feasible to enforce access control policies without requiring an administrative manual process of granting access or issuing a security token to be passed by an information requestor to an information provider. Example embodiments integrate widely-accepted but traditionally incompatible access control standard protocols to create an interoperable security environment for authorization.

Figure 1:
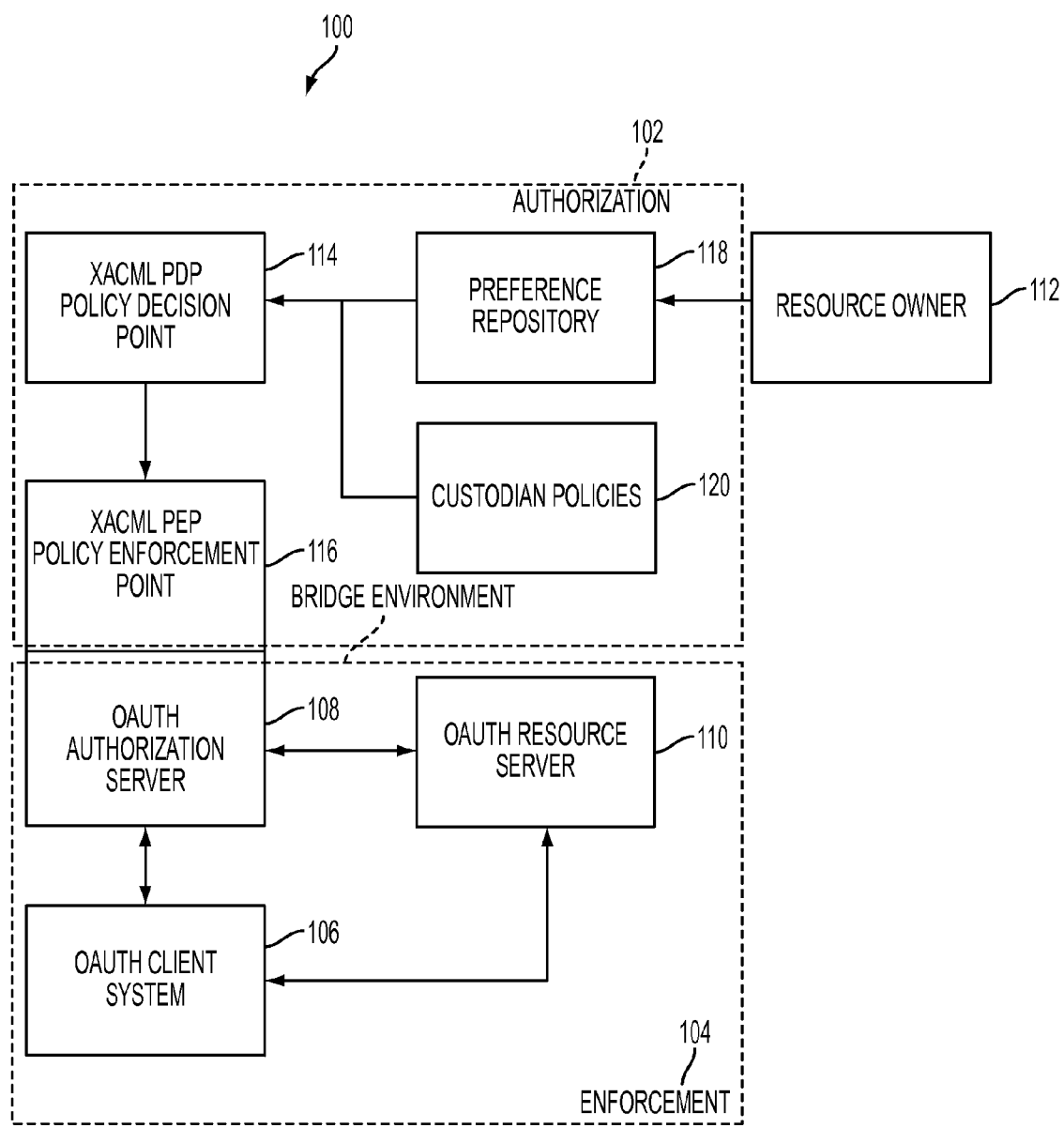
FIG. 1 is a diagram illustrating a hybrid authorization control system (HACS), according to an example embodiment.

FIG. 1 is a diagram illustrating a HACS 100, according to an example embodiment. The HACS 100 provides a link between an authorization protocol 102 and an enforcement protocol 104 to provide interoperability if the two protocols are different. The authorization protocol 102 may be any authorization control application or service. According to an exemplary embodiment, the authorization protocol 102 may be an XACML/SAML authorization control service. An enforcement protocol 104 may be any application or service enforcing access control. According to an exemplary embodiment, the enforcement protocol 104 may be a RESTful/OAuth enforcement service. In the enforcement protocol, an OAuth resource server 110 may communicate with both an OAuth client system 106 and an OAuth authorization server 108.

An access request can be any request specifying access rights to protected resources of a resource owner 112. The access request may be any access request to sensitive data or protected information of the resource owner 112. For example, an access request may be for access to Protected Health Information (PHI) in one example embodiment, or classified data in another embodiment. A client system of an enforcement protocol 104 may make an authorization request to an enforcement server which is capable of granting or denying authorization. In an example embodiment, the client system may be an OAuth client system 106, which makes an access request to an enforcement server, being an OAuth authorization server 108, for example. In one embodiment, the OAuth client system 106 requests a token from the OAuth authorization server 108, for authorization to issue a token. The OAuth authorization server 108 determines whether to issue/reissue a token based on evaluation of the access request based on communication with at least the authorization protocol 102.

The authorization protocol 102 may dovetail with the enforcement protocol 104, acting as an implicit resource owner providing an authorization grant for the enforcement protocol 104 to issue or reissue an authorization based on an access request. When the client makes an access request in the enforcement protocol 104, the enforcement protocol 104 may communicate with the authorization protocol 102 to request the authorization protocol 102 to authorize granting of the access request. In one example embodiment, the OAuth authorization server 108 may communicate with an OAuth resource server 110 and the authorization protocol 102 including an XACML Policy Decision Point (PDP) 114 and an XACML Policy Enforcement Point (PEP) 116, to authorize issuing/reissuing a token.

The authorization protocol 102 may include at least a preference repository 118 and a repository for custodian policies 120. The preference repository 118 may contain data, for example, patient consents, and the repository for custodian policies 120 (e.g. including policy rules) are known elements of an XACML-based authorization framework. The authorization protocol 102 may utilize the preference repository 118 and the repository for custodian policies 120 to make an authorization decision on an access request. In one example, the XACML PDP 114 may communicate with the preference repository 118 and the repository for custodian policies 120 to assist in making a decision as to whether or not to authorize issuance of an access request. The preference repository 118 may store any data which may be utilized by the XACML PDP 114 to make a decision as to whether or not to authorize issuance of an access request. The repository for custodian policies 120 may include any policy data, including policy rules, which may be utilized by the XACML PDP 114 to make a decision as to whether or not to authorize issuance of an access request.

The XACML Policy Enforcement Point (PEP) 116 communicates with the XACML PDP 114 including receiving an approval from the XACML PDP 114 based on an evaluation of the client access request and application of data from the preference repository 118 and the repository for custodian policies 120. In one embodiment, the XACML PEP 116 permits issuing/reissuing of a token based on a decision of the XACML PDP 114. THE XACML PEP 116 may communicate with the OAuth authorization server 108 to acknowledge permission for issuance/reissue of a token based on an access request. Thus, the authorization protocol 102 authorizes the issuing of a token by the enforcement protocol 104.

Figure 2:
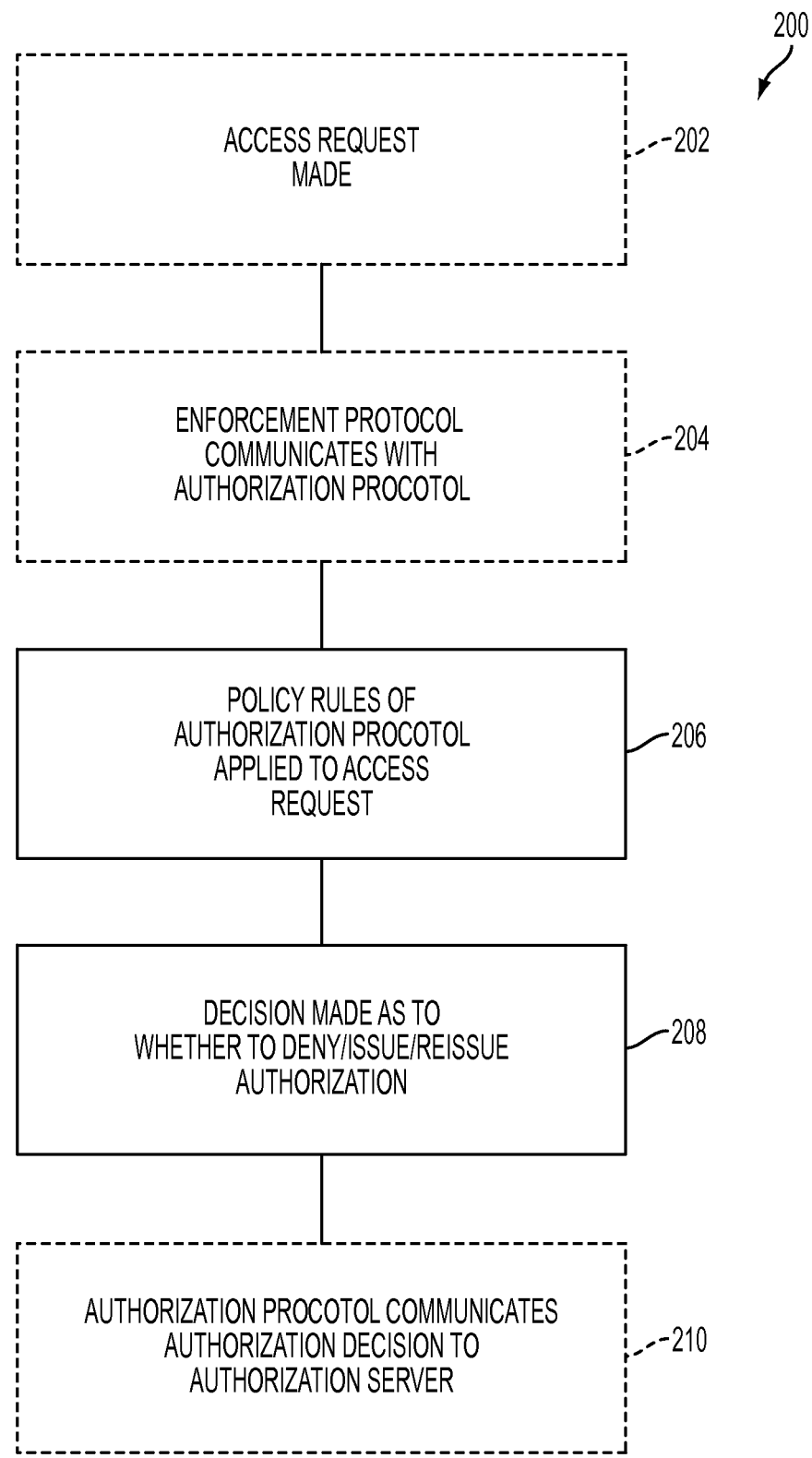
FIG. 2 is a process flow of a method performed for access control continuity, according to an example embodiment.

FIG. 2 is a process flow illustrating a method 200 performed according to an example embodiment. The method 200 describes an interaction between an authorization protocol and an enforcement protocol, which are traditionally not interoperable. The authorization protocol may be an application, system or software operable with a device, which is capable of making authorization decisions. The enforcement protocol may be any application, system or software operable with a device, which is capable of providing access control. The enforcement protocol may grant access to objects as well as what operations are allowed on given objections, for example to users or system processes. Among other things, each access request may evaluate a subject and an operation.

An access request may be made for access to data protected by a resource owner (block 202). In an exemplary embodiment, the access request is made in the enforcement protocol. The access request may be for granting access to any sensitive or protected data. In one example embodiment, an authorization protocol may act as an implicit resource owner providing an authorization grant for an access request enforced by an enforcement protocol. In an aspect of an embodiment, a client may make a request for access to PHI. In one example embodiment, an access request is made from a client of the enforcement protocol. The access request may come from a device associated with a client of the enforcement protocol.

At block 204, the enforcement protocol communicates with an authorization protocol. In an exemplary embodiment, the authorization protocol is XACML/SAML and the enforcement protocol is RESTful/OAuth. XACML/SAML and RESTful/OAuth are not traditionally interoperable access control protocols. The enforcement protocol may pass data of the access request to the authorization protocol so that the authorization protocol is able to make a decision as to whether to authorize an access request. In other words, the authorization protocol may make an authorization decision which is enforced through the enforcement protocol.

In an exemplary embodiment, when the authorization protocol and the enforcement protocol lack security continuity, a bridge environment is created for communication between the authorization protocol and the enforcement protocol. The bridging environment may be any software run on devices having a processor, to specify how software components of the authorization protocol and the enforcement protocol should interact. The bridge environment may be any application, plug-in or add-on software, which is capable of running on processing devices. In one exemplary embodiment, the bridge environment is a middleware adapter. Operation of the bridge environment may occur in conjunction with software of the enforcement protocol and the authorization protocol.

In an example embodiment, the bridge environment may exist between an OAuth Authorization Server 108 and the enforcement point XACML PEP 116 for bidirectional communication of the authorization request. In an aspect of an embodiment, a RESTful/OAuth enforcement protocol may seek an access authorization by linking to an XACML/SAML authorization protocol. The bridge environment may be enabled at a point that the enforcement server requires an authorization decision from the authorization server.

The bridge environment may link to a Policy Decision Point (PDP) 114 for authorization. For example, the bridge environment may link into an XACML/SAML PDP. The bridge environment may provide data translation between the enforcement protocol 104 and the authorization protocol 102. For example, the bridging environment may evaluate an access request received in the enforcement protocol by translating data into a readable format for the authorization protocol to apply its policy rules. Data translation may also be provided by the bridge environment in a case where the authorization protocol 102 communicates to the enforcement system, for example, when an authorization result is sent using the enforcement protocol 104.

At block 206, policy rules using an authorization protocol are applied to an access request made in an enforcement protocol. In one exemplary embodiment, application of the policy rules occurs in the bridge environment. In an example embodiment, the policy rules may be obtained from a repository of custodian policies (e.g. the repository for custodian policies 120 of FIG. 1). Data from a preference repository (e.g. the preference repository 118 of FIG. 1) may also be applicable as policy rules to enable the authorization protocol to authorize the access request. That is the policy rules may include data from a preference repository. When the policy rules of the authorization protocol are applied to an access request made in the enforcement protocol, a result is produced. In one example embodiment, the authorization protocol may use its policy rules to evaluate both a subject and an operation of the access request using data associated with the authorization protocol.

A decision is made whether to deny/issue/reissue an authorization based on a result of applying the policy rules of block 206 as shown in block 208. In an exemplary embodiment, the decision to authorize the access request is made in the authorization protocol, using the bridge environment. In another exemplary embodiment, the decision to authorize the access request is made in the enforcement protocol or using the OAuth access token, using the bridge environment.

Block 210 identifies that the authorization protocol communicates an authorization decision to the authorization server. Based on the authorization decision, the enforcement protocol determines whether or not to issue/reissue the access request. In an exemplary embodiment, a token is issued/reissued by the enforcement protocol when the authorization protocol authorizes the access request. Communication and/or transmission of data, for example of the authorization decision, between the authorization protocol and the enforcement may be made via the bridge environment.

Figure 3:
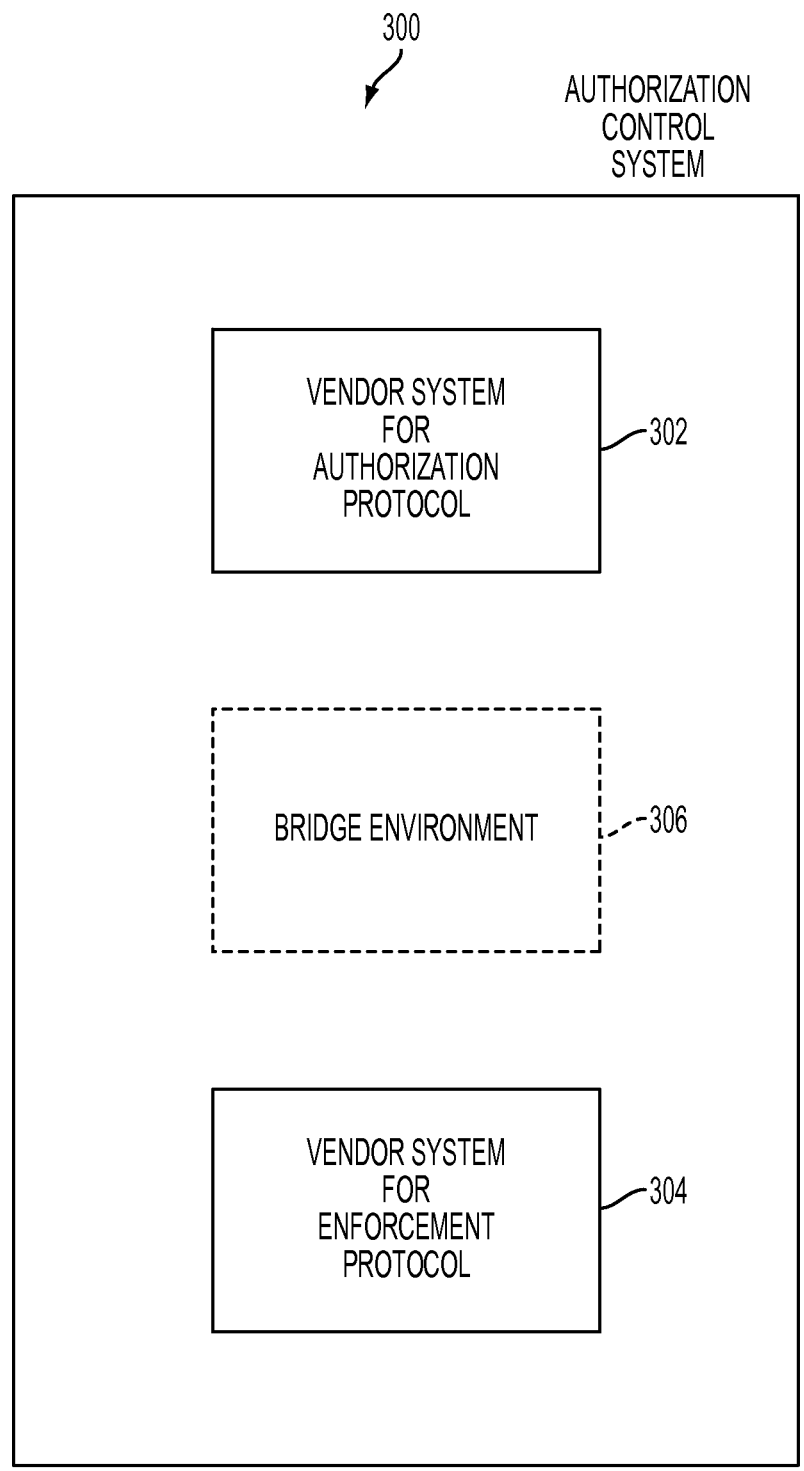
FIG. 3 is a diagram illustrating an authorization control system which includes a bridge environment operable between an authorization protocol and an enforcement protocol, according to an example embodiment.

FIG. 3 is a diagram illustrating an authorization control system 300 which includes the bridge environment 306. The bridge environment 306 may be an application interface or middleware adapter operable between an authorization protocol and an enforcement protocol. The authorization control system 300 may act a collaborative part in a multi-vendor solution between different vendor systems. For example, a vendor system 302 may be used for an authorization protocol such as XACML/SAML, and a different vendor system 304 may be used for an enforcement protocol using RESTful/OAuth. The bridge environment 306 may be combinable with the vendor systems 302 and 304, respectively, to provide a single product for interoperability between vendor systems. In alternative embodiments, the bridge environment 306 may be separately marketable as an add-on or plug-in application, among other things, communicating with respective vendor systems 302 and 304.

The bridge environment 306 may be any software programmable to execute on a device having a processor. In one example embodiment, the bridge environment 306 may be an application programming interface. As an example, the bridge environment 306 can be implemented in any programming language. Examples of such programming language can include Java, C, and C## for Microsoft® environments, among others. However, alternative implementations of the bridge environment 306 may be used depending on a target access enforcement system, for example.

Figure 4:
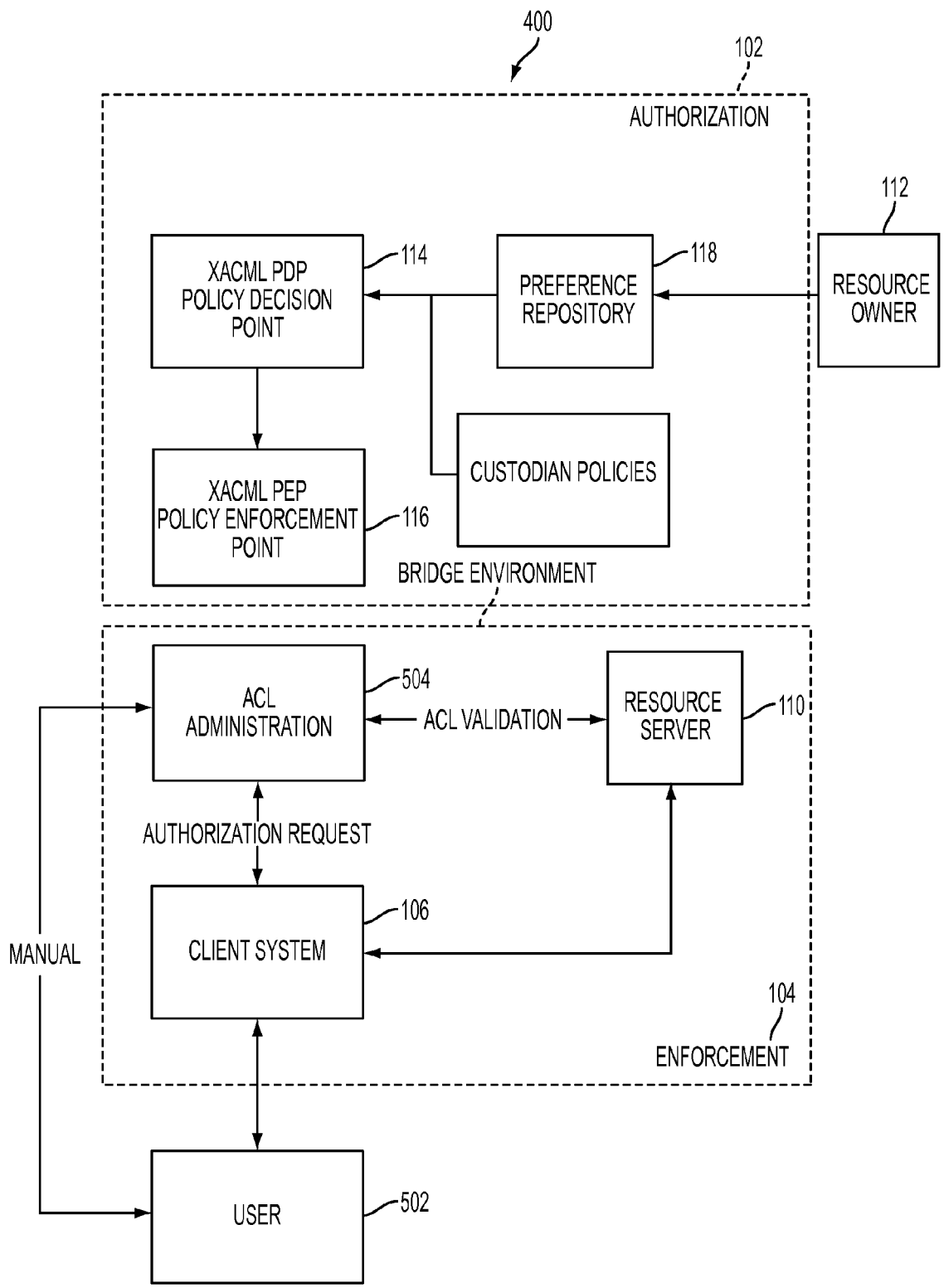
FIG. 4 is a diagram illustrating an HACS, according to an example embodiment.

FIG. 4 is a diagram illustrating a HACS 400, according to an example embodiment. For ease of understanding, the illustration of FIG. 4 includes some of the components of the HACS 100 shown in FIG. 1 and described in the foregoing. In an automated process, an enforcement protocol (such as the enforcement protocol 104 described in FIG. 1) decides whether to issue/reissue a token correspond with the authorization request by the user 402, based on an authorization decision provided by an authorization protocol (such as the authorization protocol 102 described in FIG. 1).

The bridge may also support semi-automated authorization decisions for access control to administrators managing Access Control Lists (ACLs). An ACL specifies which users or system processes are granted access to objects, as well as what operations are allowed on given objects. The interaction of an ACL driven enforcement system with the HACS is depicted in FIG. 4. In the HACS 400, a user 402 makes a manual authorization request for data to ACL administration 404. In an example embodiment, the ACL administration 404 may include an OAuth authorization server 108, such as the OAuth authorization server 108 as described in FIG. 1. A user 402 may be required to initiate a process of manually contacting an administrator of the ACL administration 404 to make a decision on granting the authorization request.

In an exemplary embodiment as shown in FIG. 4, processing of an authorization request of the user 402, made via a client system 106 of the enforcement protocol 104, may be automated using a bridge that communicates to the PDP and PEP using the authorization protocol to render a decision to the administrator. In other words, communication between a client system 106 of and ACL administration 404, including the authorization request may be semi-automated using an administrator, or fully automated without relying on an administrator. In an exemplary embodiment, the ACL administration 404 may be augmented by an XACML policy enforcement point (e.g. the XACML PEP 116 as described in FIG. 1) which provides capability of making a decision in support of or replacing an administrator.

When a request is made by the user 402 in a fully automated process via a client system (such as the client system 106 described in FIG. 1) of the enforcement protocol, the authorization request may be automatically transmitted to the ACL administration 404. The ACL administration 404 automatically communicates with an authorization protocol (such as the authorization protocol 102 described in FIG. 1) to make an authorization decision on whether to grant the authorization request. A decision is made on the authorization request by the authorization protocol, and the decision is automatically communicated back to the ACL Administration 404 via the XACML PEP 116. The ACL administration 404 communicates the decision of whether to issue/reissue the token to the client system of the enforcement protocol, in an automated fashion.

In addition to the above described embodiments, example embodiments can also be implemented as hardware, e.g., at least one hardware based processing unit including at least one processor capable of implementing any above described embodiment. The described hardware devices may be configured to act as one or more software modules in order to perform the operations of the above-described exemplary embodiments, or vice-versa.

The methods described above may also be implemented through computer readable code/instructions stored in/on a medium, e.g., a computer readable medium, to control at least one processing element to implement any above described embodiment. The medium can correspond to a non-transitory medium/media permitting the storing or transmission of the computer readable code. The computer readable medium may also be embodied in at least one application specific integrated circuit (ASIC) or Field Programmable Gate Array (FPGA).

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, a processing element could include at least one processor or at least one computer processor, and processing elements may be distributed or included in a single device.

According to an aspect of the embodiments of the invention, any combinations of one or more of the described features, functions, operations, and/or benefits can be provided. The word (prefix or suffix article) "a" refers to one or more. A combination can be any one of or a plurality. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers.

According to exemplary embodiments, the described features, functions, operations, and/or benefits can be implemented by and/or use computing hardware and/or software executed by computing hardware. For example, a processing apparatus may comprise a computing controller (CPU) or computing processing system (e.g., one or more processing devices (e.g., chipset(s), including memory, etc.) (e.g., a hardware logic circuitry based computer processor(s)) that processes or executes instructions stored in a memory, namely software/program), computer readable media (e.g., that stores information objects), transmission communication interface (network interface), input device, and/or an output device, for example, a display device, and which can be in communication among each other through one or more data communication buses. In an example embodiment, the processing device 400 may include at least one memory.

In addition, an apparatus can include one or more apparatuses in a computer network which are capable of communication with each other or other devices within or external to the computer network. A computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software. According to an aspect of an embodiment, configuring an apparatus, device, computer processor, refers to such apparatus, device or computer processor programmed or controlled by software to execute the described functions.

Although embodiments have been shown and described, it should be appreciated by those skilled in the art that changes may be made in these embodiments without departing from the principles and spirit of the disclosure, the scope of which is defined in the claims and their equivalents. Since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method comprising:
by at least one processor:
generating a bridge environment between an XACML authorization protocol and an OAuth enforcement protocol,
applying, across the bridge environment, policy rules of the XACML authorization protocol to an access request made in the OAuth enforcement protocol, and thereby producing a result;
deciding, across the bridge environment, whether to issue or reissue an authorization to the access request based on the result of the applying.

2. The method of claim 1, wherein the access request is a request for issuance of a token and the token is denied, issued, or reissued based on the authorization.

3. The method of claim 1, wherein the bridge environment enables an XACML server to perform the applying and the deciding, and to communicate data corresponding to the access request between the XACML authorization protocol and the OAuth enforcement protocol.

4. The method according to claim 3, wherein the bridge environment is a middleware adapter, application interface, embedded code, firmware, or hardware.

5. The method according to claim 3, wherein the bridge environment receives the authorization request in a data format corresponding with the OAuth enforcement protocol, translates the data format into a readable format for the XACML authorization protocol to apply the policy rules, and communicates the result of the deciding to the OAuth enforcement protocol.

6. The method according to claim 1, wherein the bridge environment interfaces an access enforcement point in an OAuth authorization server to request an XACML Policy Decision Point (PDP) to decide whether to issue or reissue the authorization.

7. The method according to claim 1, wherein the applying and the deciding are automatically performed after an authorization request is made.

8. The method according to claim 1, wherein the authorization request corresponds with access to Protected Health Information (PHI) as contained in an electronic health record, protected information, sensitive information, or classified information.

9. A non-transitory computer-readable medium which when executed on a computer causes the computer to execute a process comprising:
generating, using the computer, an interface between an XACML authorization protocol and an OAuth enforcement protocol, and applying, using the interface, policy rules of the XACML authorization protocol to an access request made in a different or incompatible enforcement protocol and thereby producing a result.

10. The non-transitory computer-readable medium according to claim 9, wherein the process comprising:
translating, before the applying, a data format of the authorization request received from the OAuth enforcement protocol into a data format readable by the XACML authorization protocol.

11. The non-transitory computer-readable medium according to claim 9, wherein the computer receives the authorization request from the OAuth enforcement protocol and applies, in the applying, the policy rules of the XACML authorization protocol.

12. An authorization control device comprising:
a memory; and
a processor connected with the memory, configurable to operate as an application interface or middleware adapter between an XACML authorization protocol and an OAuth enforcement protocol, the processor executing:
applying, using the interface or middleware adapter, policy rules of the authorization protocol to an access request made in the enforcement protocol and thereby producing a result.

13. The authorization control system according to claim 12, wherein the OAuth enforcement protocol is associated with a vendor enforcement system, the XACML authorization protocol is associated with a vendor authorization system, and the application interface is combinable with the vendor authorization system and the vendor access enforcement system to form a single vendor product.

14. The authorization control system according to claim 12, wherein the processor receives the access request in a data format corresponding with the OAuth enforcement protocol, translates the data format into a readable format for the XACML authorization protocol to apply the policy rules, and sends the result of the deciding to the OAuth enforcement protocol.

15. The authorization control system according to claim 12, wherein the processor automatically performs the applying when the access request is received.

16. The authorization control system according to claim 12, wherein the processor is a server operating in an XACML environment, and
the result of the applying is transmitted from the server to an OAuth server which issues or reissues a token to authorize a user, based on the access request.

17. A method performed by a device having a processor, comprising:
receiving, by an administration apparatus of an OAuth enforcement protocol, an authorization request from a client system;
generating, using the processor, an interface between an XACML authorization protocol and the OAuth enforcement protocol;
requesting, a policy enforcement point of the XACML authorization protocol by the administration apparatus of the OAuth enforcement protocol, to provide an authorization decision indicating whether the authorization request is authorized, where the authorization protocol applies policy rules across the interface to the authorization request to produce the authorization decision; and
determining, by the administration apparatus of the OAuth enforcement protocol, whether to issue or reissue a security token based on the authorization decision communicated by the policy enforcement point of the XACML authorization protocol.

* * * * *